United States Patent [19]

Cogar

[11] Patent Number: 5,106,598
[45] Date of Patent: Apr. 21, 1992

[54] LAMP RECLAMATION PROCESS

[76] Inventor: Michael J. Cogar, 25815 Folley Rd., Columbia Station, Ohio 44028

[21] Appl. No.: 310,046

[22] Filed: Feb. 10, 1989

[51] Int. Cl.$^5$ ............................................. B02C 19/12
[52] U.S. Cl. ......................................... 423/99; 241/99
[58] Field of Search ............................. 423/99; 241/99

[56] References Cited

U.S. PATENT DOCUMENTS

| | | | |
|---|---|---|---|
| 2,108,216 | 2/1938 | Stringer | 176/2 |
| 2,267,435 | 12/1941 | Thomas | 15/7 |
| 2,593,657 | 4/1952 | Coon et al. | 241/47 |
| 2,620,988 | 12/1952 | Tellier | 241/62 |
| 2,628,036 | 2/1953 | Hall | 241/99 |
| 2,866,604 | 12/1958 | Hall | 241/99 |
| 3,913,849 | 10/1975 | Atanasoff et al. | 241/55 |
| 4,268,306 | 5/1981 | Bjorkman | 75/81 |
| 4,442,582 | 4/1984 | Foo et al. | 29/403.3 |
| 4,545,540 | 10/1985 | Nakamura | 241/99 |
| 4,607,798 | 8/1986 | Odlin | 241/99 |
| 4,655,404 | 4/1987 | Deklerow | 241/99 |
| 4,715,838 | 12/1987 | Kulander | 445/61 |

*Primary Examiner*—Peter D. Rosenberg
*Attorney, Agent, or Firm*—D. Peter Hochberg; Mark Kusner; Louis J. Weisz

[57] ABSTRACT

A process and system for disposing of fluorescent lamps and reclaiming components therefrom which includes the removal of the lamp ends and the washing of the lamp envelopes, or crushed lamp envelopes, with wash water to remove mercury and phosphors therefrom. The wash water is then screened to remove glass fragments, and phosphors and mercury present are removed therefrom by decantation and centrifugation. The residual wash water is thereafter treated with a reducing agent to precipitate remaining mercury, and the precipitate is eliminated by decantation and filtration. Additional mercury and cadmium present in the wash water is thereafter removed by treatment with a cationic exchange resin, and the wash water is recycled along with the other water streams produced during the processing.

12 Claims, 1 Drawing Sheet

LAMP RECLAMATION PROCESS

TECHNICAL FIELD

This invention relates to the elimination of hazardous wastes and to the recycling of waste materials to useful products. More particularly, this invention relates to the disposal of fluorescent lamps in a way in which the hazardous materials contained therein, including metals such as cadmium and mercury, are isolated for safe disposal, while other components of the lamps are recycled for useful purposes. Specifically, this invention relates to reclaiming components from discarded fluorescent lamps by procedures comprising the disassembly and washing of unbroken lamp envelopes, and the crushing and washing of still other lamp envelopes, followed by the subsequent separation of the various components of the lamps by operations which include screening, centrifugation, decantation, chemical treatment, and ion exchange.

BACKGROUND OF THE INVENTION

In recent years, most individuals have become highly sensitized to the problem of pollution, and to its adverse effects on the environment, as well as on the quality of life of those living within it. As a result of such awareness, society as a whole has become increasingly intolerant of pollution and polluters, and considerable pressure has been brought to bear on those responsible for pollution. Among other things, such pressure has included the enactment of laws placing constraints on the amount of pollution that is permitted, or prohibiting it altogether.

Furthermore, there is a growing realization of the correlation between consumption and the manufacturing operations that support it, which to an important degree, aggravate the pollution problem. For this reason, as well because of the recognition that there are finite limits to the raw materials on which society depends, there has been an increasing emphasis on conservation and reclamation. This is exemplified by the reprocessing of discarded articles such as, for instance, aluminum beverage cans, articles made from plastics, rubber goods, and the like.

In connection with pollution, it has long been recognized that fluorescent lamps present a particularly difficult problem. Such lamps, for instance, contain hazardous metals such as mercury used as an ultraviolet light source within the lamp, and the cadmium employed in connection with lamp phosphors. With respect to the disposal of mercury, for example, the state of California has recently enacted a hazardous waste management law which necessitates the handling of fluorescent lamps as hazardous wastes since the mercury present in the lamps exceeds the maximum weight percentage for non-hazardous waste specified by the law. Unfortunately, the disposal of materials falling into the hazardous waste category requires specially designed landfills, and the cost is exorbitant. Consequently, an alternative method of disposal is an economic necessity.

In the past, various methods have been proposed for the disposal of fluorescent lamp. Typically, these involve the crushing of the glass envelopes in equipment in which the hazardous metals, phosphors and the like, are disposed of by being confined in airstreams which are exhausted at remote locations, or captured in water streams which are diverted to sewers, or retained for further unspecified processing. Activated charcoal filters have also been suggested for removing hazardous dust generated during the bulb crushing operation.

While useful in achieving what may be considered gross containment of the hazardous contents of fluorescent lamps, or the disposal thereof by dilution with air and/or water, the procedures and devices heretofore taught either immediately, or eventually result in the undesirable release of the dangerous liquids or gases used in the containment procedures described to the environment. Furthermore, none of the processes or methods entail a comprehensive recycling procedure in which all of the lamps components are safety isolated and accumulated for additional, useful purposes.

DISCLOSURE OF THE INVENTION

In view of the preceding, therefore, it is a first aspect of this invention to provide an improved method for disposing of discarded fluorescent lamps.

A second aspect of this invention is to furnish a method for disposing of fluorescent lamps which prevents the discharge of pollutants therefrom into the environment.

Another aspect of this invention is the separation and recovery of the components of discarded fluorescent lamps in a condition which facilitates their reuse.

A further aspect of this invention is to contain the water used in the fluorescent lamp recovery process in a "closed loop" configuration, thereby avoiding release of potentially polluting materials into the environment.

An additional aspect of this invention is to avoid the necessity of disposing of discarded fluorescent lamps in expensive hazardous waste landfill sites.

Yet another aspect of this invention is to dispose of fluorescent lamps in a manner which complies with governmental regulations governing the disposal of hazardous waste.

A still additional aspect of this invention is to conserve raw materials and decrease the pollution inherent in manufacturing replacement materials for the discarded fluorescent lamp components.

The foregoing and other aspects of this invention are provided by a process for safely disposing of, and reclaiming components from discarded fluorescent lamps comprising:

(1) removing lamp ends from the remainder of the lamp;

(2) washing the remainder of the lamp with wash water;

(3) substantially separating lamp glass from other lamp solids, and from the wash water;

(4) substantially separating said other lamp solids from said wash water;

(5) forming substantially water insoluble mercury compounds in said wash water;

(6) substantially separating said mercury compounds from said wash water, and (7) treating said wash water with a cation exchange resin.

The foregoing and still other aspects of the invention are provided by a process for safely disposing of and reclaiming glass envelopes and other components from discarded fluorescent lamps comprising:

(1) separating the metal ends from the lamps;

(2) washing the glass envelopes of said lamps with wash water sprays, thereby removing the solid contents therefrom;

(3) substantially separating said solid contents from said wash water by decantation and centrifugation;

(4) combining said wash water with a reducing agent thereby forming a substantially water insoluble mercury compound in said wash water;

(5) substantially separating said mercury compound from said wash water by filtration, and (6) treating said wash water with a cation exchange resin.

The foregoing and yet other aspects of the invention are provided by a process for safely disposing of, and for reclaiming components from discarded fluorescent lamps comprising:

(1) removing the metal ends from the lamps;

(2) crushing the glass envelopes of said lamps;

(3) washing the crushed envelopes with wash water;

(4) substantially separating the crushed envelope glass from other lamp solids, and from the wash water by screening;

(5) substantially separating said other lamp solids from said wash water by decantation and centrifugation;

(6) treating said wash water with a reducing agent to form a substantially water insoluble mercury compound in said wash water;

(7) substantially separating said mercury compound from said wash water by filtration, and (8) treating said wash water with a cation exchange resin.

The foregoing and additional aspects of the invention are provided by a system for safely disposing of, and reclaiming the components from discarded fluorescent lamps comprising in combination:

(1) a lamp envelope crusher;

(2) first tankage provided with agitation for receiving the debris ejected from said crusher and for washing said debris with wash water;

(3) a vibrating screen for receiving the wash water and said debris from said first tankage and for retaining glass thereon;

(4) second tankage for receiving first material passing through said screen, said second tankage having an upper outlet, and a lower outlet;

(5) a centrifuge for receiving second material from said lower outlet and for separating solids therefrom;

(6) third tankage for receiving third material from said upper outlet and for treating said third material with a reducing agent;

(7) a decanter for receiving said treated third material;

(8) a filter for receiving fourth material from the bottom of said decanter;

(9) a sand filter for receiving fifth material from the top of said decanter, and

(10) cation exchange resin for treating sixth material passing through said sand filter.

BRIEF DESCRIPTION OF THE DRAWINGS

The invention will be better understood when reference is had to FIG. 1 which shows a semi-schematic process flow diagram illustrating one embodiment of the disposal and reclamation steps, and the equipment employed in connection with the invention.

DETAILED DESCRIPTION OF THE INVENTION

Figure 1:
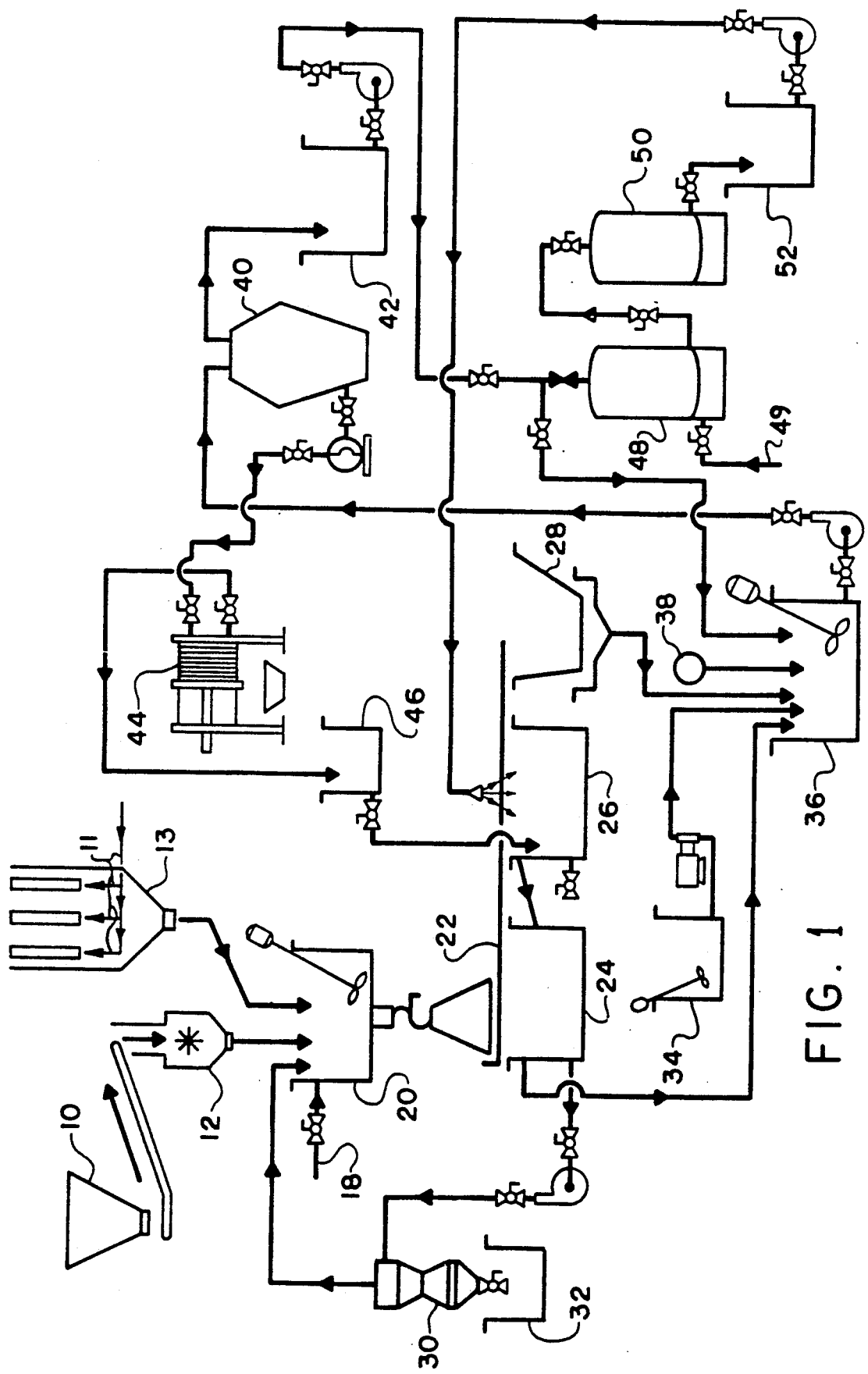

Fluorescent lamps produce light primarily by the conversion of ultraviolet energy from a low-pressure mercury arc to visible light. The lamp consists of a glass tube or envelope containing two electrodes, an interior coating of a powdered "phosphor," and a small amount of mercury. The electrodes provide a source of free electrodes to initiate the arc, while the phosphors are chemicals, or mixtures of chemicals that convert the short-wave ultraviolet energy into visible light. Argon gas, introduced in small quantities, produces the ions that facilitate initiation of the arc that results in the vaporization of the mercury to produce the ultraviolet radiation.

Specifically, a typical fluorescent lamp involves a phosphor coated lime glass envelope positioned between two aluminum bases provided with tungsten electrodes. About 25 to 50 milligrams of mercury are included on the interior of the envelope, the latter containing about 2 to 3 grams of the phospor coating per foot of tubing.

The process of the invention results in the reclamation of the lamp materials and their reuse in various applications. For example, the glass recovered can be used for abrasive blasting of selected surfaces, or as fill material for road paving and other uses. The recovered phosphors can be recycled to lamp manufacturers, while the mercury reclaimed can be used in all applications where mercury is required. The larger glass envelopes, i.e., those 8 feet in length, can be cut down and reused by fluorescent lamp manufacturers to fabricate 4 foot lamps. The aluminum bases can be employed by manufacturers of aluminum goods, following their washing and remelting. Similarly, the tungsten may be remelted for fabrication into new tungsten articles.

A unique advantage of the inventive system resides in the fact that all the water used in the reclaiming process is recycled and reused, thus avoiding the need to discharge it to the environment. Equipment of the type disclosed may be erected at a location convenient to reclamation centers where the discarded lamps are collected, or it can be incorporated in "skid-mounted" portable units transferable from location-to-location as dictated by need.

Referring now to FIG. 1, a plant is shown having dual processing capabilities, that is, one that can handle either the reclamation of glass envelopes in substantially their original condition, as well as the reclamation of crushed envelopes, together with the other lamp components. In instances where the lamps to be processed are those having an 8 foot length, the process will usually be run in its lamp washing mode. When thus operated, the ends of the lamp are removed, and the lamps are placed in a lamp washer device 13 where they are contacted with high pressure water sprays 11; the wash water containing the separated mercury and phosphors is then discharged into tank 20.

When the plant is operated in its crushed glass mode, the ends of the lamp are removed and the envelopes placed in hopper 10 where they are conveyed to a crusher 12, from which the lamp debris, including broken glass, mercury, and phosphors, are likewise discharged into tank 20. The crusher will typically be operated to provide glass fragments of a type capable of passing 25 mesh screening, but which are retained on 100 mesh. Wash water 18 in the tank includes that resulting from the water sprays 11, when the plant is operated in a lamp washing mode, as well as water recycled from the centrifuge 30, as more particularly described hereafter, and water 18 additionally added, as required. Tank 20 is provided with agitation, particularly when the plant is operated in a crushed glass mode, to assure that phosphors and mercury clinging to the glass fragments are dislodged therefrom. The agitation may be of the type produced by turbines, propellers, paddles, air sparges or by other methods. The size of the tank 20 will depend upon the throughput anticipated, a 200 gallon tank being adequate in most cases. The residence time of the material in the tank will be sufficient to assure that the desired dislodgement occurs, and can readily be determined by visual inspection.

The phosphors, mercury, and when present, glass are discharged together with the wash water onto a vibrating screen 22, sized to retain 100 mesh material.

The tankage illustrated in Figure, comprises two tanks 24 and 26, respectively, as well as a screen-bottomed hopper 28. The glass fragments held by screen 22 are transported to, and discharged into the hopper 28 after being subjected to additional spray washing adjacent wash water tank 26. The contents of wash water tank 26 overflow into wash water tank 24 as illustrated. While two tanks, i.e., 24 and 26 are illustrated, a single tank could be employed if desired.

Again, the size of the tanks will depend upon the throughput required, with tanks having a capacity of about 200 gallons normally being adequate for the purpose.

Tank 24 has a lower outlet which discharges to a centrifuge 30, the solids from which latter are ejected into discharge hopper 32. The liquid discharge from the centrifuge 30 is recycled back to tank 20. The material fed from the lower outlet of tank 24 to the centrifuge consists of wash water associated with the majority of the phosphors and mercury. The discharge from the upper outlet of tank 24 consists mainly of wash water containing dissolved mercury and cadmium, where cadmium is employed in producing the phosphors, in some cases together with finely divided mercury. The material discharged from wash water tank 24 is fed into treatment tank 36 where most of the mercury remaining in the wash water is reduced to an insoluble state. While other size tanks may be employed, it has been found convenient to use a tank having a capacity of about 400 gallons. The amount of reducing agent added will depend upon the amount of mercury present in the wash water, it simply being desirable to assure that an excess of reducing agent is available in the tank. Determination of such amount is within the skill of those operating such processes.

In the treatment tank 36, a reducing agent prepared in a pre-mix tank 34 is added. In the pre-mix tank 34, a suitable reducing agent such as sodium sulphite, sodium bisulfite or equivalent material is dissolved in water and metered into the treatment tank as required. In the case of sodium sulphite and sodium bisulfite, the mercury is reduced to produce mercury sulfide, a water insoluble solid. The tank is agitated both to assure adequate contact of the reducing agent with the mercury present, as well as to keep the precipitate formed therein in suspension. Other methods of reduction might also be employed, however, for example, sulfur dioxide could be sparged directly into the tank.

The tank also provides a convenient point at which to adjust the pH of the wash water with a base such as sodium hydroxide, or an acid for instance, sulfuric acid, to facilitate subsequent removal of unreacted mercury, and cadmium when present, by cationic exchange resins as more particularly described in the following. pH adjustment, which may be monitored and controlled by pH controller 38, can however, be accomplished at another point in the process if desired. Also discharged into the treatment tank 36 is the wash water drained from the glass particles in the screen bottomed hopper 28.

After treatment as described, the precipitate-containing wash water is transferred to a decanter 40, from the bottom of which the solids-rich material is fed to a filter 44. The filter can be of the plate-and-frame variety, a rotary filter, a leaf filter, or others of the types well-known to the art. The balance of the wash water in decanter 40 is discharged to an intermediate storage tank 42, optional equipment that provides the advantage of compensating for flow rate changes sometimes occurring during the reclamation operation. Where an intermediate tank is employed, a tank with a capacity of about 200 gallons will be convenient in most cases.

The wash water leaving the intermediate storage tank 42 is introduced into a sand filter 48 which serves to provide a fine or "polish" filtration for the wash water. As shown, piping 49 is provided to "back-flush" the filter, the back-flush water being fed back to treatment tank 36. In connection with equipment involving capacities as previously stated, a sand filter having a capacity of approximately 100 gallons per minute will provide adequate capacity.

Following the fine filtration, the wash water is fed to ion exchanger 50, packed with a cationic exchange resin, for example, that marketed by Rhom-Haas under the name "Duolite GT73." The purpose of the ion exchange resin is to remove vestigal amounts of remaining mercury, as well as the cadmium, from the wash water.

Different types of resins sometimes require particular pH ranges to provide optimal performance; consequently, the pH adjustment described in connection with treatment tank 36 will be such as to provide a wash water with a pH best suited for the resin employed. The pH adjustment could be accomplished elsewhere in the process if desired. With respect to mercury removal, the wash water leaving the treatment tank will typically contain no more than from about 25 to 100 parts per billion of mercury, while that leaving the ion exchanger 50 will contain less than about 10 parts per billion of mercury.

Waste water discharged from the ion exchanger is transferred into intermediate storage tank 52 where the pH may again be adjusted to a value of from about 6 to 9 in the event, for any reason, a discharge of wash water to the sewer must be made. In normal operation, however, the waste water is recycled back to serve as the spray water employed in connection with the lamp glass on the vibrating screen 22 over wash water tank 26. An intermediate tank 52 of about 100 gallon capacity is useful for the purpose.

As previously stated, the residence time of the materials being processed in the equipment described is not critical, and will be readily determined by those skilled in the art. Similarly, processing temperatures may be varied within a wide range, ambient temperatures being satisfactory, provided they are above the freezing point of the wash water.

The type of phosphor employed as the coating on the interior of lamp envelopes helps to determine the color of the light obtained; consequently, different lamps will typically employ different phosphors. Separation of lamps according to the type of phosphors they contain is not essential, however, since recycled phosphors can be adjusted by the manufacturer at the time of their reuse. Mercury present in the phosphors may be separated by any of the techniques known in the art, for example, by distillation.

While in accordance with the patent statutes, a preferred embodiment and best mode has been presented, the scope of the invention is not limited thereto, but rather is measured by the scope of the attached claims.

What is claimed is:

1. A process for safely disposing of, and reclaiming components from discarded fluorescent lamps comprising:
   (1) removing the lamp ends from the remainder of the lamp;
   (2) washing the remainder of the lamp with wash water;
   (3) substantially separating lamp glass from other lamp solids and from the wash water;
   (4) substantially separating said other lamp solids from said wash water;
   (5) forming substantially water insoluble mercury compounds in said was water by combining said wash water with a reducing agent;
   (6) substantially separating said mercury compounds from said wash water;
   (7) treating said wash water with a cationic exchange resin, and
   (8) recycling said wash water in a closed loop for reuse in the process.

2. A process according to claim 1 wherein said reducing agent is a member selected from the group consisting of sodium sulphite, sodium bisulphite, and sulfur dioxide.

3. A process according to claim 1 wherein the separation of said other solids is carried out by centrifugation and decantation.

4. A process according to claim 1 wherein said lamps are crushed after removing said ends, but prior to washing said remainder of the lamp.

5. A process according to claim 1 wherein said lamp glass is removed by means of a vibrating screen.

6. A process according to claim 1 wherein said mercury compounds are removed by filtration and decantation.

7. A process according to claim 1 wherein the hydrogen ion concentration of said wash water is adjusted to a predetermined value before its treatment with said resin.

8. A process for safely disposing of and reclaiming glass envelopes and other components from discarded fluorescent lamps comprising:
   (1) separating the metal ends from the lamps;
   (2) washing the glass envelopes of said lamps with wash water sprays, thereby removing the solid contents therefrom;
   (3) substantially separating said solid contents from said wash water by decantation and centrifugation;
   (4) combining said wash water with a reducing agent, thereby forming a substantially water insoluble mercury compound in said wash water;
   (5) substantially separating said mercury compound from said wash water by filtration;
   (6) treating said wash water with a cationic exchange resin, and
   (7) recycling said wash water in a closed loop for reuse in the process.

9. A process according to claim 8 in which said reducing agent is a member selected from the group consisting of sodium sulphite, sodium bisulphite, and sulfur dioxide.

10. A process for safely disposing of and reclaiming components from discarded fluorescent lamps comprising:
    (1) removing the metal ends from the lamps;
    (2) crushing the glass envelopes of said lamps;
    (3) washing the crushed envelopes with wash water;
    (4) substantially separating the crushed envelope glass from other lamp solids, and from the wash water by screening;
    (5) substantially separating said other lamp solids from said wash water by decantation and centrifugation;
    (6) treating said wash water with a reducing agent to form a substantially water insoluble mercury compound in said wash water;
    (7) substantially separating said mercury compound from said wash water by filtration;
    (8) treating said wash water with a cationic exchange resin, and
    (9) recycling said wash water in a closed loop for reuse in said process.

11. A process according to claim 10 in which said reducing agent is a member selected from the group consisting of sodium sulphite, sodium bisulphite, and sulfur dioxide.

12. A system for safely disposing of, and reclaiming the components from discarded fluorescent lamps comprising in combination:
    (1) a lamp envelope crusher;
    (2) first tankage provided with agitation for receiving the debris ejected from said crusher and for washing said debris with wash water;
    (3) a vibrating screen for receiving the wash water and said debris from said first tankage and for retaining glass thereon;
    (4) second tankage for receiving first material passing through said screen, said second tankage having an upper outlet and a lower outlet;
    (5) a centrifuge for receiving second material from said lower outlet and for separating solids therefrom;
    (6) third tankage for receiving third material from said upper outlet and for treating said third material with a reducing agent;
    (7) a decanter for receiving said treated third material;
    (8) a filter for receiving fourth material from the bottom of said decanter;
    (9) a sand filter for receiving fifth material from the top of said decanter, and
    (10) cationic exchange resin for treating sixth material passing through said sand filter.

* * * * *